Patented Oct. 6, 1953

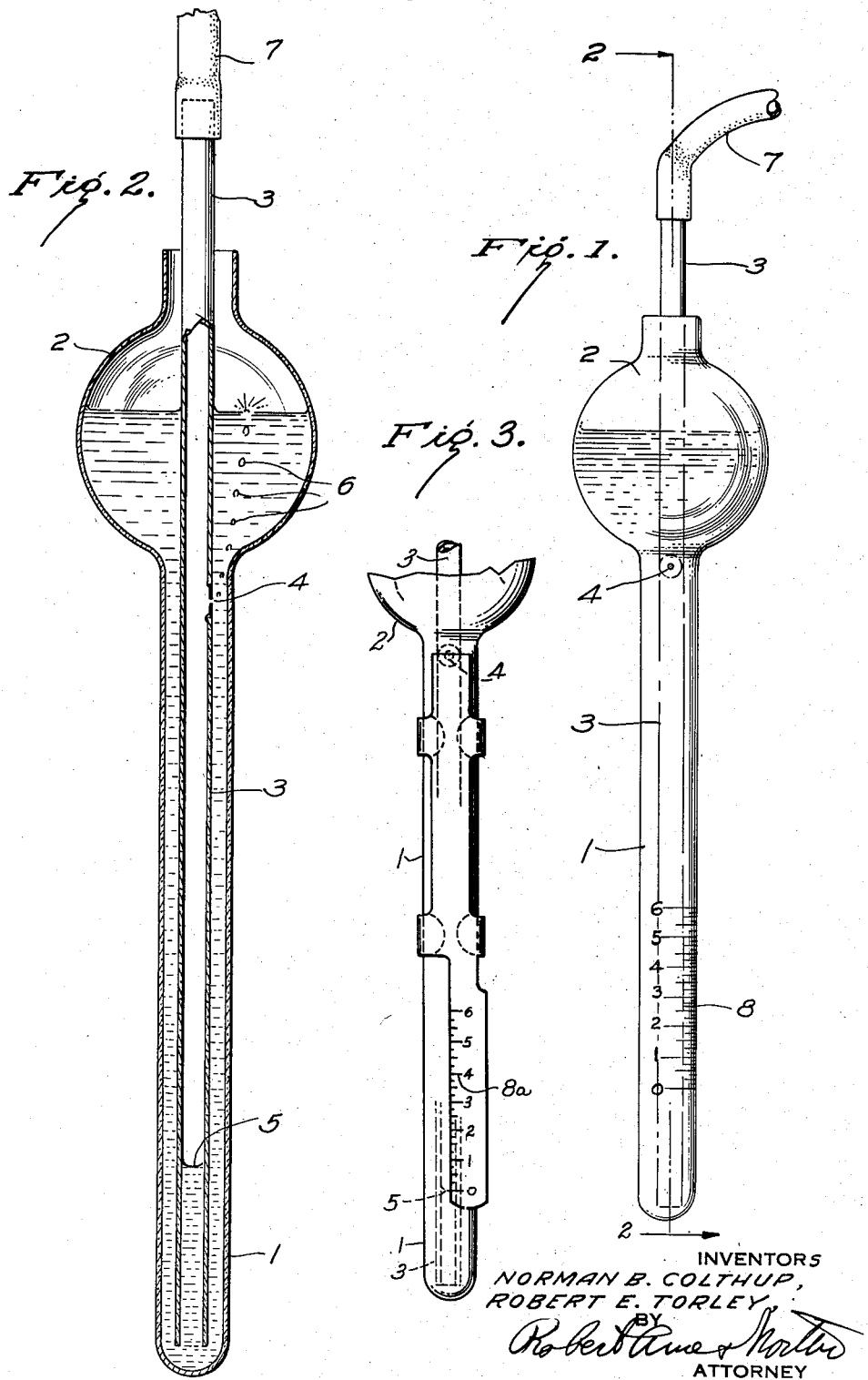

2,654,243

UNITED STATES PATENT OFFICE 2,654,243

APPARATUS FOR USE IN MEASURING SURFACE TENSION

Norman B. Colthup, Stamford, and Robert E. Torley, Greenwich, Conn., assignors to American Cyanamid Company, New York, N. Y., a corporation of Maine Application September 16, 1950, Serial No. 185,284

3 Claims. (Cl. 73—53)

This invention relates to an improved surface tension measuring device for liquids.

Surface tension of liquids has been measured by what is called the "bubble method," in which the pressure required to form and burst a bubble of the liquid is measured. These devices require removal of excess liquid as they are very sensitive to the depth of liquid over the orifice. Another serious drawback to the type of device where a single bubble is blown and burst is that only one or at most a very limited number of measurements can be made without opening up the equipment and adding more liquid. It has also been proposed to force gas through a manometer tube. This however, has required that the level of the liquid in the manometer tube legs be kept at an accurately predicted point.

While it has been possible with some of the bubble instruments used in the past, and referred to above, to make fairly accurate measurements of surface tension when great caution was exercised, they have been much less satisfactory in the hands of the ordinary laboratory technician and for the most part these devices have made a large number of measurements in quick succession difficult or impossible. Averaging of readings has therefore been practically out of the question and the increased reliability and accuracy obtainable by averaging a number of readings is still something which could not be practically obtained on the instruments hitherto designed.

Another drawback has been the price and complexity of the apparatus and the practical impossibility of making measurements on a number of liquids in a short time because the apparatus used hitherto did not permit rapid disassembly and cleaning.

The present invention is directed to a very simple, cheap and reliable instrument which permits multiple readings in rapid succession and can be used to measure the surface tension of a number of liquids in fairly rapid succession. The typical embodiment of the invention lies in the drawings:

Fig. 1 is an elevation of the device.

Fig. 2 is a longitudinal section, slightly enlarged, along the line 2—2 of Fig. 1.

Figure 3 is an elevation of the device, partly broken away, showing a further modification of the scale illustrated in connection with the device shown in Figure 1.

The device comprises an elongated glass vessel 1, provided with an enlarged bulb 2. In the vessel there projects an open-end measuring tube 3, provided with an accurately calibrated fine orifice 4, and connected through the pipe 7, to a source of gas under pressure, for example, an ordinary laboratory compressed air pipe. A scale 8a is mounted adjacent to the container 1 and is adjustably and detachably secured thereto as shown in Figure 3, or if desired the scale may be etched thereon as shown in Figure 1.

In operation, the container 1 is filled with the liquid, the surface tension of which is to be measured, until the latter partly fills the bulb 2 and submerges the orifice 4. Pressure on the gas is then increased until bubbles 6 start to escape from the orifice 4. The pressure at the moment of escape is measured by the depression of the meniscus 5, below the orifice 4, in the control tube 3. The scales 8 and 8a may be suitably calibrated so that the meniscus position gives a measure of the desired surface tension. A microscope or magnifying reading glasses (not shown) may be provided to read the scale more accurately, as is conventional in measuring instruments. The equation giving the measurement of surface tension is as follows:

$$Xg\rho = 4\gamma/d$$

where X is the displacement of the meniscus below the orifice when bubbling occurs, $g$ the gravity constant, $\rho$ the liquid density, $d$ the diameter of the orifice, and $\gamma$ the surface tension.

In operation the pressure is slowly increased until bubbling starts, at which point the meniscus will rise until bubbling ceases, and the cycle is repeated. Preferably, the flow of gas under pressure is arranged to lower the meniscus about 2 or 3 mm. per second. A number of readings may be taken in quick succession of all the lowest points reached by the meniscus, that is to say, at the instant bubbling starts, and the average may be taken for greater accuracy.

One of the marked advantages of the present invention is that within wide limits the height of the liquid in the bulb or tube above the orifice even 10 cm. of water, requires only a second order correction in the result. It is therefore not necessary to fill the device to an exact level and the accuracy of the measurement does not depend on great care in operation. On the other hand, accuracy is affected by the size of the orifice and by the requirement that the material surrounding the orifice be uniformly wet by the liquid. For this reason it is desirable to use a material that is readily wet, for example, a small platinum disc sealed into the central glass tube 3. An orifice of the order of magnitude of from 0.1 to 0.2 mm. gives satisfactory results. For example, even an orifice of 0.16 with distilled water will give a meniscus displacement under standard conditions of about 20 cm.

The precision of the measurement is better than one part in 1000 under average conditions. The following table shows typical results and gives a very close agreement with surface tension measured by other means and reported in the literature.

| Substance | X cm. | Temperature °C. | σ measured dynes/cm. | σ reported dynes/cm. |
|---|---|---|---|---|
| Carbon tetrachloride | 4.19 | 25.0 | 25.89 | 26.0 |
| Acetone | 7.42 | 25.0 | 22.77 | 23.0 |
| Benzene | 8.27 | 25.0 | 28.12 | 28.1 |

When it is desired to measure a number of different liquids, it is only necessary to change the inner tube 3 with its orifice. This can be transferred from one container containing one liquid to another container containing another liquid with rapid cleaning between measurements, an advantage not possessed by instruments hitherto used, where cleaning of the whole instrument was necessary when changing from one liquid to another, representing a fairly time consuming operation.

Another very important advantage of the present invention for certain specialized uses is that its operation depends on a pressure differential between the gas pressure in the inner tube and the pressure at the orifice. In most cases, the pressure on the liquid in the open-end container is atmospheric, however, this is not at all necessary for the operation of the device and the liquid in the open-end container may be under pressure above or below the atmosphere. This makes it possible for the first time to measure practically surface tension changes in systems which are under pressure opening a new field for surface tension measurements. In a more specific aspect, therefore, the invention includes operation of the instrument in such systems.

We claim:
1. An apparatus for use in measuring the surface tension of a liquid comprising an elongated, close-end liquid container, a concentric open-ended inner tube extending nearly to the bottom of said container, said outer container and said inner tube being of transparent material, said inner tube having an orifice in the side thereof below the normal level to which liquid is filled into said outer container, an adjustable scale mounted adjacent to the lower end of said container, and means for applying an increasing pressure of gas to said inner tube whereby the depression of the meniscus below the orifice of said inner tube may be read on said scale at the moment bubbles emerge from said orifice.

2. A device according to claim 1 in which the outer container is provided with an enlarged section at the upper end thereof.

3. An apparatus for use in measuring the surface tension of a liquid comprising an elongated transparent tube closed at one end, an inner transparent tube open at both ends vertically disposed within said outer tube and extending downwardly adjacent to the bottom thereof, said inner tube having an orifice in the wall thereof located below the normal liquid level in said outer tube, means for supplying gas under pressure to said inner tube so as to depress the meniscus therein, and means for measuring the displacement of the meniscus from the orifice of said inner tube.

NORMAN B. COLTHUP.
ROBERT E. TORLEY.

References Cited in the file of this patent
UNITED STATES PATENTS

| Number | Name | Date |
|---|---|---|
| 1,365,488 | Hanau | Jan. 11, 1921 |
| 2,054,438 | Natelson | Sept. 15, 1936 |
| 2,401,053 | Cupples | May 28, 1946 |

FOREIGN PATENTS

| Number | Country | Date |
|---|---|---|
| 264,952 | Switzerland | Feb. 1, 1950 |